US008319365B2

(12) United States Patent
Hemmelmann et al.

(10) Patent No.: US 8,319,365 B2
(45) Date of Patent: *Nov. 27, 2012

(54) SYSTEM AND METHOD TO PROVIDE CONSTANT SPEED MECHANICAL OUTPUT IN A MACHINE

(75) Inventors: Jan Erich Hemmelmann, Munich (DE); Michal-Wolfgang Waszak, München (DE)

(73) Assignee: General Electric Company, Niskayuna, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/972,207

(22) Filed: Dec. 17, 2010
(Under 37 CFR 1.47)

(65) Prior Publication Data
US 2012/0025527 A1    Feb. 2, 2012

(51) Int. Cl.
*F03D 9/00*    (2006.01)
(52) U.S. Cl. ............................................. 290/44; 290/55
(58) Field of Classification Search .................... 290/44, 290/55
See application file for complete search history.

(56) References Cited

U.S. PATENT DOCUMENTS

| | | | |
|---|---|---|---|
| 7,560,824 B2 | 7/2009 | Hehenberger | |
| 7,615,884 B2* | 11/2009 | McMaster | 290/55 |
| 7,851,933 B2* | 12/2010 | Duffey et al. | 290/44 |
| 8,067,847 B1* | 11/2011 | Waszak et al. | 290/44 |
| 2008/0223684 A1 | 9/2008 | Duffey et al. | |

FOREIGN PATENT DOCUMENTS

WO    2010040167 A1    4/2010

OTHER PUBLICATIONS

Frank et al., "Gearing Ratios of a Magnetic Gear for Wind Turbines", IEEE International Electric Machines and Drives Conference, May 3-6, 2009, pp. 1224-1230.
Rossi et al., "W-CVT Continuously Variable Transmission for Wind Energy Conversion System", IEEE Power Electronics and Machines in Wind Applications, Jun. 24-26, 2009, 10 Pages.
Xueyong et al., "A Novel Power Splitting Drive Train for Variable Speed Wind Power Generators", Renewable Energy, Elsevier Science Ltd, Oct. 2003, vol. 28, Issue 13, pp. 2001-2011.

* cited by examiner

*Primary Examiner* — Tho D Ta
(74) *Attorney, Agent, or Firm* — Nitin N. Joshi

(57) ABSTRACT

A system to provide constant speed mechanical output in a wind turbine is provided. The system includes at least one electrical machine configured to convert a rotary mechanical power received from a main gear to a machine electrical power. The system further includes one or more electrical converters electrically coupled to the machine and configured to convert the machine electrical power from a direct current (DC) power to an alternate current (AC) power or from the alternate current (AC) power to the direct current (DC) power, where the converters generate a differential electrical power. A torque converter is electrically coupled to the electrical converters and generates a constant speed mechanical output employing the differential electrical power received from the one or more electrical converters.

19 Claims, 3 Drawing Sheets

SYSTEM AND METHOD TO PROVIDE CONSTANT SPEED MECHANICAL OUTPUT IN A MACHINE

BACKGROUND

Renewable forms of energy, such as wind power, have become increasingly desirable sources for meeting present and future electrical power requirements. Wind power typically is harvested through the use of a wind turbine that includes a hub having multiple wind turbine blades mechanically coupled to a rotatable shaft. The rotatable shaft is connected, either directly or indirectly, to a generator. For example, the generator includes a synchronous generator.

Typically, the generators require a constant input angular velocity for efficient operation. However, an angular velocity of the wind varies constantly and the rotatable shaft is unable to provide the constant input angular velocity to the generator. Generally, a variable speed magnetic coupling is provided to address the aforementioned issue. The variable speed magnetic coupling is provided at the rotatable shaft that eliminates the variations in angular velocity of the rotatable shaft and provides the constant input angular velocity to the generators. The variable speed magnetic coupling converts an electrical power to a mechanical power and transfers the mechanical power to the rotatable shaft to maintain the constant input angular velocity.

Conventionally, the variable speed magnetic coupling withdraws the electrical power directly from the grid for its operation leading to various grid code compliance issues resulting in complexities and expense.

For these and other reasons, there is a need for embodiments of the invention.

BRIEF DESCRIPTION

A system to provide constant speed mechanical output in a wind turbine is provided. The system includes at least one electrical machine configured to convert a rotary mechanical power received from an input shaft to a machine electrical power. The system further includes one or more electrical converters electrically coupled to the machine and configured to convert the machine electrical power from a direct current (DC) power to an alternate current (AC) power or from the alternate current (AC) power to the direct current (DC) power, where the converters generate a differential electrical power. A torque converter is electrically coupled to the electrical converters and generates a constant speed mechanical output employing the differential electrical power received from the one or more electrical converters.

DRAWINGS

These and other features, aspects, and advantages of embodiments of the present invention will become better understood when the following detailed description is read with reference to the accompanying drawings in which like characters represent like parts throughout the drawings, wherein.

DETAILED DESCRIPTION

Embodiments of the present invention include a system and method to provide a constant speed mechanical output in a wind turbine system. The system includes at least one electrical machine that is disposed on an intermediary shaft attached to a main gear at one end and to a torque converter at a second end. The electrical machine converts rotary mechanical power received from an input shaft to a machine electrical power. The machine electrical power is transmitted to one or more electrical converters that convert the machine electrical power from a direct current (DC) power to an alternate current (AC) power. The alternate current power is transmitted to the torque converter that converts the alternate current power to an auxiliary mechanical power and transfers the auxiliary mechanical power to an output shaft mechanically coupled to the torque converter. The auxiliary mechanical power generated by the torque converter is added with the rotary mechanical power to provide a constant speed mechanical output. The constant speed mechanical output is fed to a synchronous generator to generate a grid electrical power.

Figure 1:
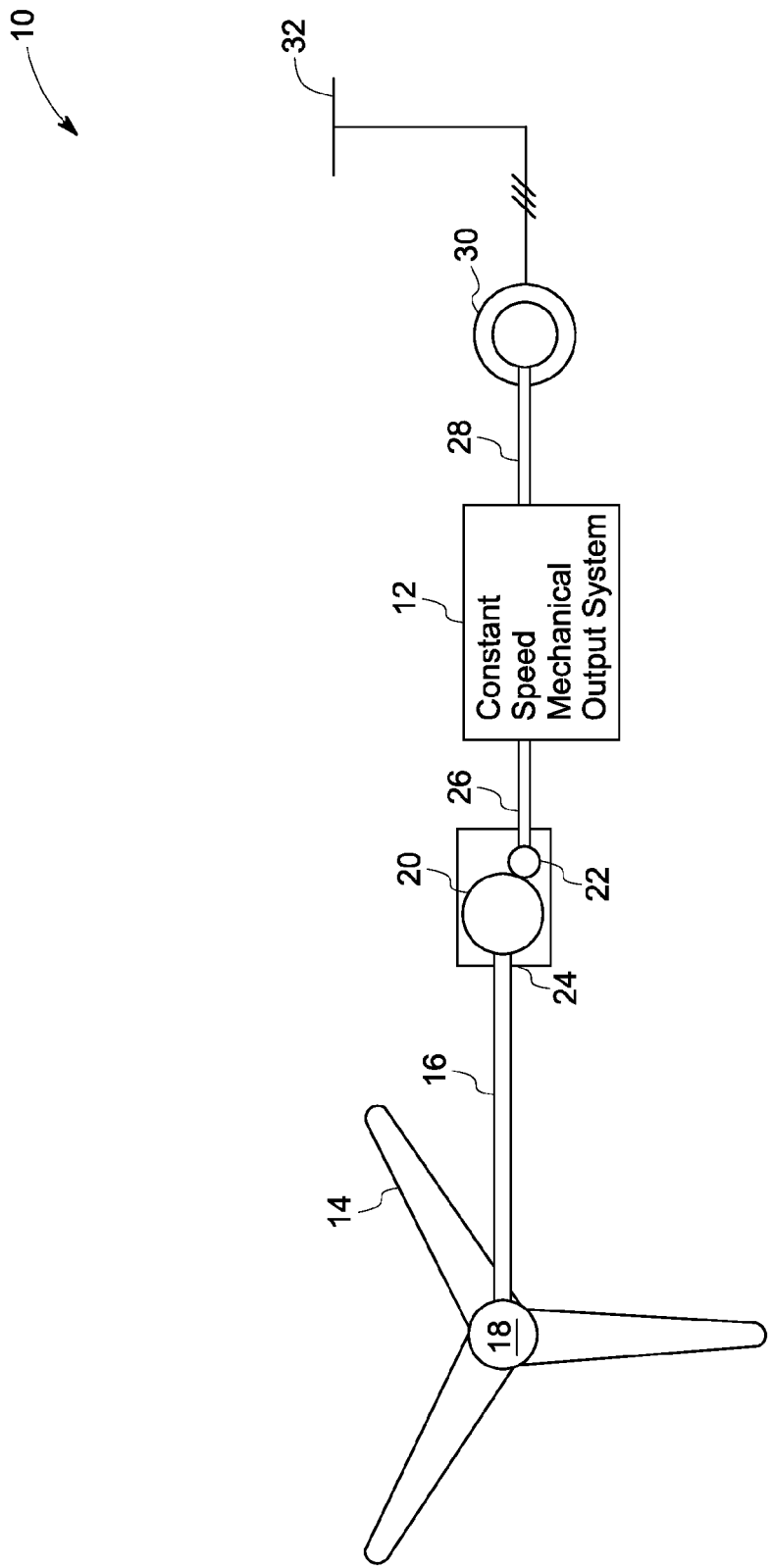
FIG. 1 is a schematic representation of a wind turbine system including a constant speed mechanical output system in accordance with an exemplary embodiment of the invention.

FIG. 1 is a schematic representation of a wind turbine system 10 including a constant speed mechanical output system 12 in accordance with an exemplary embodiment of the invention. The wind turbine system 10 includes multiple wind turbine blades 14 attached to an input shaft 16 at one end 18. In operation, wind strikes the multiple wind turbine blades 14 at a wind angular velocity that causes the multiple wind turbine blades 14 to rotate at a blade angular velocity. The multiple wind turbine blades 14 further rotate the input shaft 16 at an input angular velocity. As used herein, the term 'angular velocity' is a rotational speed measured in rounds per minute (rpm) and may be used interchangeably. As illustrated, in one embodiment, the input shaft 16 is mechanically coupled to a main gear 20 provided in a drive train 22 at a second end 24. The drive train 22 increases the input angular velocity to an intermediary angular velocity via a planetary gear set within the drive train 22. The drive train 22 is connected to an intermediary shaft 26 that is mechanically coupled to the constant speed mechanical output system 12. In an exemplary embodiment, the input shaft may be directly mechanically coupled to the intermediary shaft or the constant speed mechanical output system. The constant speed mechanical output system 12 provides a constant speed mechanical output to an output shaft 28 to rotate at a constant angular velocity. The output shaft 28 rotating at the constant angular velocity drives a synchronous generator 30.

In operation, the wind angular velocity varies due to various environmental factors. The variation in the wind angular velocity results in a dynamic blade angular velocity. The dynamic blade angular velocity causes the input angular velocity to change or vary resulting in an undesired variation of the intermediary angular velocity. As understood, a constant angular velocity of the output shaft 28 is required to operate the synchronous generator 30. The variation in the intermediary angular velocity is regulated by the constant speed mechanical output system 12 to provide the constant angular velocity to the output shaft 28. In an exemplary embodiment, an auxiliary mechanical power generated by the constant speed mechanical output system 12 provides the constant angular velocity to the output shaft 28 described herein.

The constant speed mechanical output system 12 receives the intermediary angular velocity and determines the difference between an angular velocity at the output shaft 28 and the intermediary angular velocity. The constant speed mechanical output system 12 generates the auxiliary mechanical power based on the difference that is added with the intermediary angular velocity to maintain the constant angular velocity at the output shaft 28. In one embodiment, the constant speed mechanical output system 12 includes a feedback mechanism (not shown) for maintaining the constant angular velocity at the output shaft 28. The output shaft 28 rotates the synchronous generator 30 at the constant angular velocity to generate a grid electrical power that is transmitted to a power grid 32. The constant speed mechanical output system 12 can be better understood with respect to FIG. 2 below.

Figure 2:
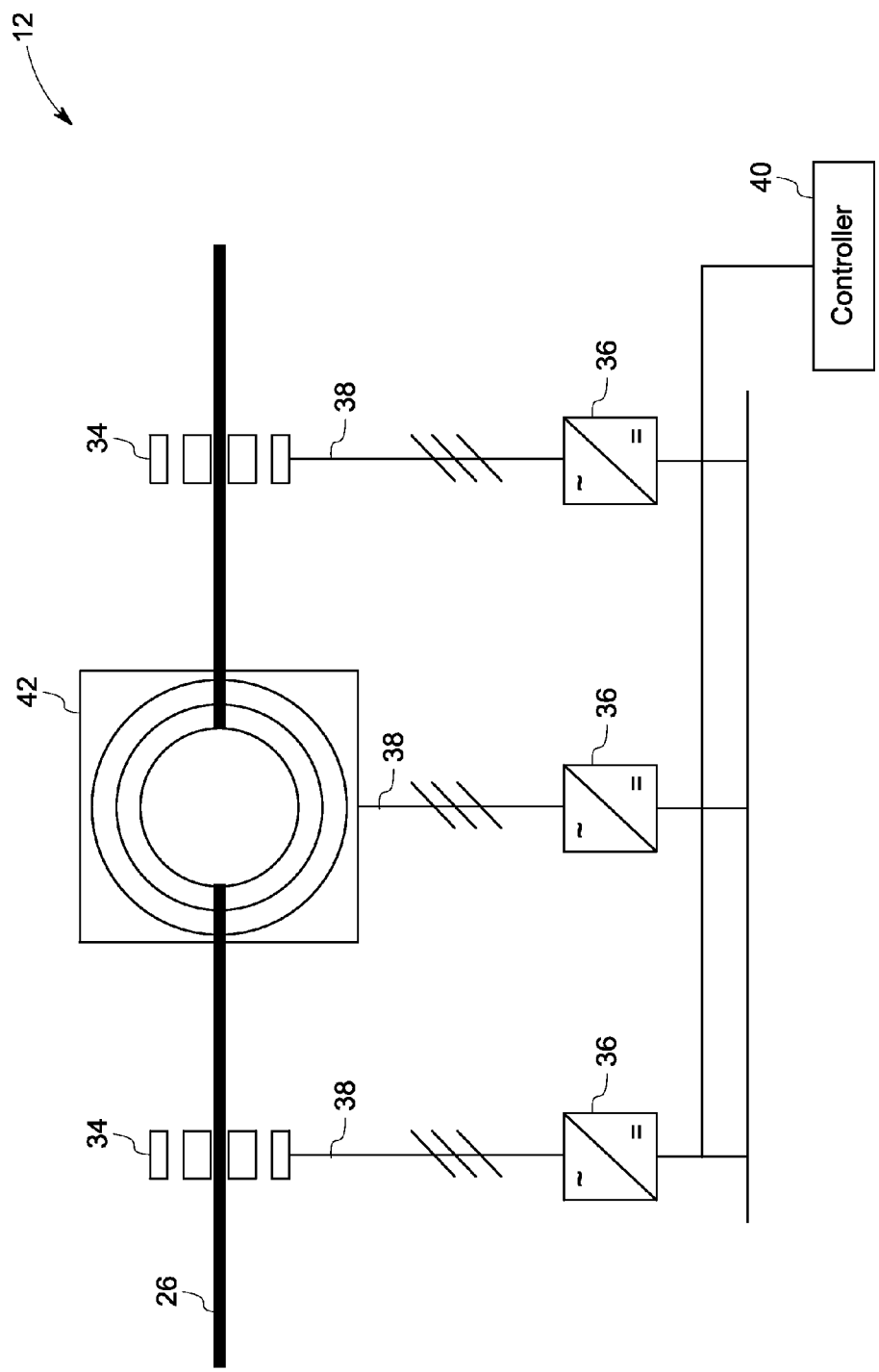
FIG. 2 is a magnified view of the constant speed mechanical output system of FIG. 1 in accordance with an exemplary embodiment.

FIG. 2 is a magnified view of the constant speed mechanical output system 12 provided in the wind turbine system 10 of FIG. 1 in accordance with an exemplary embodiment of the invention. The constant speed mechanical output system 12 includes at least one electrical machine 34 that is mechanically coupled to the intermediary shaft 26. The machine 34 is rotated by the intermediary shaft 26 at the intermediary angular velocity to convert the rotary mechanical power of the intermediary shaft 26 to a machine electrical power. In an exemplary embodiment, the machine 34 includes a rotary power generator. In another embodiment, the at least one electrical machine 34 is provided at the intermediary shaft 26 or the output shaft 28 or both. In an exemplary embodiment, the machine 34 may perform as a motor that converts electrical power to a mechanical power in order to drive the intermediary shaft.

The electrical machine 34 transmits the machine electrical power to one or more electrical converters 36 electrically coupled to the machine 34 via multiphase leads 38. The converters 36 convert the machine electrical power from a direct current (DC) power to an alternate current (AC) power. The electrical converters 36 may also convert an alternate current (AC) power to the direct current (DC) power as and when required in operation of the wind turbine 10 (FIG. 1). The one or more electrical converters 36 are electrically coupled to a controller 40. The controller 40 determines the difference between the angular velocity at the output shaft 30 and the intermediary angular velocity. The controller 40 identifies a differential electrical power that is required by a torque converter 42 to maintain the constant angular velocity at the output shaft 28 and regulates the one or more electrical converters 36 to transmit the differential electrical power to the torque converter 42. The operation of the controller 40 is described in detail with respect to a commonly assigned patent application Ser. No. 12/911,284 entitled, "Variable Speed Magnetic Coupling and Method for Control," filed on Oct. 24, 2010.

The torque converter 42 receives the differential electrical power from the converters 36 electrically coupled to the torque converter 42 via multiphase leads 38. The torque converter 42 converts the differential electrical power to the auxiliary mechanical power that is added to the intermediary angular velocity of the intermediary shaft 26 to provide the constant speed mechanical output and maintain the constant angular velocity. In one embodiment, the torque converter 42 includes a variable speed magnetic coupling. The operation of the torque converter 42 can be better understood with respect to the commonly assigned patent application referenced herein.

The torque converter 42 is further mechanically coupled to the output shaft 28 that receives the constant speed mechanical output from the torque converter 42. The output shaft 28 drives the synchronous generator 30 at the constant angular velocity to generate a grid electrical power that is fed to the power grid 32.

Figure 3:
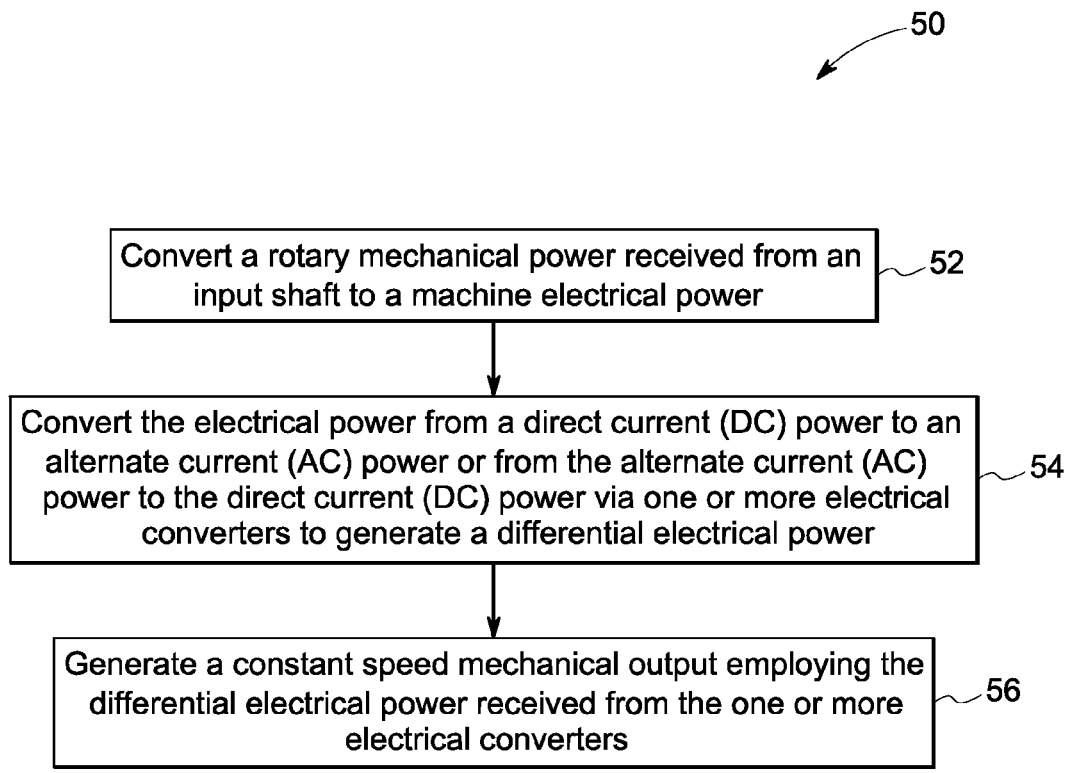
FIG. 3 is a flow chart for a method for providing a system for generating a constant speed mechanical output in a wind turbine in accordance with an embodiment of an invention.

FIG. 3 is a flow chart representing the steps involved in a method 50 for providing a constant speed mechanical output in a wind turbine in accordance with an embodiment of an invention. The method 50 includes converting a rotary mechanical power received from a main gear to a machine electrical power in step 52. In one embodiment, the machine is provided on an intermediary shaft or an output shaft or both. In another embodiment, a rotary power generator is provided as the at least one electrical machine. The machine is electrically coupled to one or more electrical converters via multiphase leads. The electrical converters convert the machine electrical power received from the at least one electrical machine to an alternate current (AC) power from a direct current (DC) power or to a direct current (DC) power from an alternate current (AC) power at step 54. A torque converter is electrically coupled to the converters that generate a constant speed mechanical output employing a differential electrical power received from the one or more electrical converters in step 56. In one embodiment, a variable speed magnetic coupling is provided as a torque converter. The constant speed mechanical output is provided to control a speed of the output shaft. In a particular embodiment, the speed of the output shaft is controlled via controlling the differential electrical power received by the torque converter. The differential electrical power received by the torque converter is controlled by a controller electrically coupled to the one or more electrical converters. Furthermore, the constant speed mechanical output is transmitted to a synchronous generator electrically coupled to a power grid.

The various embodiments of a system and method to provide constant speed mechanical output to the wind turbine described above provide a constant angular velocity to an output shaft to drive a synchronous generator. The constant angular velocity is provided by adding an auxiliary mechanical power to an intermediary shaft of the wind turbine system. The auxiliary mechanical power is provided by a torque converter that generates the auxiliary mechanical power from a differential electrical power provided by the one or more electrical converters. The one or more electrical converters receive a machine electrical power from at least one electrical machine provided at the intermediary shaft that generates the machine electrical power from the intermediary angular velocity of the intermediary shaft. Thus, these techniques provide a system independent of a power grid that generates the auxiliary mechanical power to provide the constant speed mechanical output to the output shaft and avoids any compliance issues due to a grid code requirement.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    an electrical machine configured to convert a rotary mechanical power received from an input shaft to a machine electrical power;
    one or more electrical converters electrically coupled to the electrical machine and configured to convert the machine electrical power from a direct current (DC) power to an alternate current (AC) power or from the alternate current (AC) power to the direct current (DC) power wherein the one or more electrical converters generate a differential electrical power; and
    a torque converter electrically coupled to the one or more electrical converters and configured to generate a constant speed mechanical output based on the differential electrical power received from the one or more electrical converters.

2. The system of claim 1, wherein the one or more electrical converters comprises an AC to DC converter or a DC to AC converter.

3. The system of claim 1, wherein the one or more electrical converters are electrically coupled to the electrical machine via multiphase leads.

4. The system of claim 1, wherein the torque converter comprises a variable speed magnetic coupling (VSMC).

5. The system of claim 1, wherein the one or more electrical converters are electrically coupled to a controller.

6. The system of claim 5, wherein the controller is configured to control the differential electrical power transmitted to the torque converter to maintain the constant speed mechanical output.

7. The system of claim 1, wherein the electrical machine is mechanically coupled to an input shaft or an output shaft or both.

8. The system of claim 7, wherein the output shaft is mechanically coupled to a synchronous generator.

9. The system of claim 8, wherein the synchronous generator is connected to a power grid.

10. The system of claim 1, wherein the electrical machine comprises a rotary power generator.

11. A method, comprising:
    providing an electrical machine;
    converting a rotary mechanical power received from an input shaft to a machine electrical power using the electrical machine;
    providing one or more electrical converters;
    electrically coupling the one or more electrical converters to the electrical machine;
    converting the machine electrical power from a direct current (DC) power to an alternate current (AC) power or from the alternate current (AC) power to the direct current (DC) power via one or more electrical converters to generate a differential electrical power using the one or more electrical converters;
    providing a torque converter;
    electrically coupling the one or more electrical converters to the torque converter; and
    generating a constant speed mechanical output employing the differential electrical power received from the one or more electrical converters using the torque converter.

12. The method of claim 11, wherein the one or more electrical converters comprises an AC to DC converter or a DC to AC converter.

13. The method of claim 11, wherein electrically coupling the one or more electrical converters to the electrical machine comprises coupling via multiphase leads.

14. The method of claim 11, wherein providing the torque converter comprises providing a variable speed magnetic coupling.

15. The method of claim 11, wherein generating the constant speed mechanical output comprises controlling a speed of the output shaft.

16. The method of claim 15, wherein controlling the speed of the output shaft comprises controlling the differential electrical power received by the torque converter.

17. The method of claim 16, wherein controlling the differential electrical power received by the torque converter comprises controlling the differential electrical power via a controller electrically coupled to the one or more electrical converters.

18. The method of claim 11, further comprising transmitting the constant speed mechanical output to a synchronous generator electrically coupled to a power grid.

19. A wind turbine gearbox including an apparatus for variable transfer of torque and speed, the apparatus comprising:
    an electrical machine configured to convert a rotary mechanical power received from a main gear to a machine electrical power;
    one or more electrical converters electrically coupled to the electrical machine and configured to convert the machine electrical power from a direct current (DC) power to an alternate current (AC) power or from the alternate current (AC) power to the direct current (DC) power wherein the one or more electrical converters generate a differential electrical power; and
    a torque converter electrically coupled to the one or more electrical converters and configured to generate a constant speed mechanical output based on the differential electrical power received from the one or more electrical converters.

* * * * *